United States Patent
Mehta et al.

(10) Patent No.: US 9,830,217 B2
(45) Date of Patent: Nov. 28, 2017

(54) SELECTIVE BLOCK-BASED INTEGRITY PROTECTION TECHNIQUES

(71) Applicant: QUALCOMM Incorporated, San Diego, CA (US)

(72) Inventors: Shital Mehta, San Diego, CA (US); Suresh Bollapragada, San Diego, CA (US); Bollapragada V. J. Manohar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 14/609,034

(22) Filed: Jan. 29, 2015

(65) Prior Publication Data

US 2016/0224404 A1 Aug. 4, 2016

(51) Int. Cl.
G06F 11/00 (2006.01)
G06F 11/07 (2006.01)
G06F 21/57 (2013.01)
G06F 21/64 (2013.01)

(52) U.S. Cl.
CPC ........ G06F 11/0793 (2013.01); G06F 21/575 (2013.01); G06F 21/64 (2013.01); *G06F 2221/2113* (2013.01)

(58) Field of Classification Search
CPC .................. G06F 11/0793; G06F 21/50–21/70
See application file for complete search history.

(56) References Cited

U.S. PATENT DOCUMENTS

| 8,806,282 | B2 | 8/2014 | Shetty et al. | |
|---|---|---|---|---|
| 8,832,455 | B1 * | 9/2014 | Drewry | G06F 21/575 |
| | | | | 713/187 |
| 2008/0092239 | A1 * | 4/2008 | Sitrick | G06F 21/10 |
| | | | | 726/27 |
| 2009/0257595 | A1 | 10/2009 | de Cesare et al. | |
| 2012/0078864 | A1 | 3/2012 | Li et al. | |

(Continued)

FOREIGN PATENT DOCUMENTS

WO 2012061678 A1 5/2012

OTHER PUBLICATIONS

Corbet, J. (Sep. 19, 2011). dm-verity. LWN.net, 5 pgs. Retrieved on Jul. 2, 2015, from https://lwn.net/Articles/459420/ [XP055199909].

(Continued)

*Primary Examiner* — Michael Makulinski
(74) *Attorney, Agent, or Firm* — Hunter Clark PLLC

(57) ABSTRACT

Techniques for protecting the contents of a computing device are provided. The techniques include associating security level information with each of a plurality of content items to be protected, the security level information including an integrity check action and a resultant behavior to be performed for each respective content item. The security level information can be built into an image comprising the content items to be protected and the image can be installed on a computing device. The techniques include accessing security level information associated with a content item responsive to a request to perform an action on the content, performing the integrity check action associated with the content item, and performing the resultant behavior associated with the content item responsive to the integrity check action indicating that the action requested cannot be performed.

24 Claims, 9 Drawing Sheets

(56) References Cited

U.S. PATENT DOCUMENTS

| | | |
|---|---|---|
| 2012/0331526 A1 | 12/2012 | Caudle et al. |
| 2013/0298242 A1 | 11/2013 | Kumar et al. |
| 2013/0346757 A1 | 12/2013 | Nick et al. |
| 2014/0130151 A1* | 5/2014 | Krishnamurthy ..... G06F 21/572 726/22 |
| 2014/0258736 A1* | 9/2014 | Merchan ................. G06F 21/62 713/193 |
| 2014/0380425 A1* | 12/2014 | Lockett ................... H04L 63/20 726/4 |
| 2016/0203313 A1* | 7/2016 | El-Moussa ................ G06F 8/65 726/23 |

OTHER PUBLICATIONS

OSSEC. (Jan. 8, 2015). Syscheck in OSSEC Open Source HIDS 2.8.1: Manual. 8 pgs. Retrieved from https://web.archive.org/web/20150108160443/http://ossec-docs.readthedocs.org/en/latest/manual/syscheck [XP055260086].
International Search Report and Written Opinion—PCT/US2016/014674—ISA/EPO—Apr. 4, 2016, 15 pgs.
Second Written Opinion from International Application No. PCT/US2016/014674—Dec. 7, 2016—5 pgs.
International Preliminary Report on Patentability—PCT/US2016/014674—European Patent Office—Munich, Germany—Mar. 2, 2017—22 pgs.

* cited by examiner

Build System

Build System

Target Device

Target Device

Perform integrity check on image responsive to request to perform action associated with content item Build the image and associate content with security level information

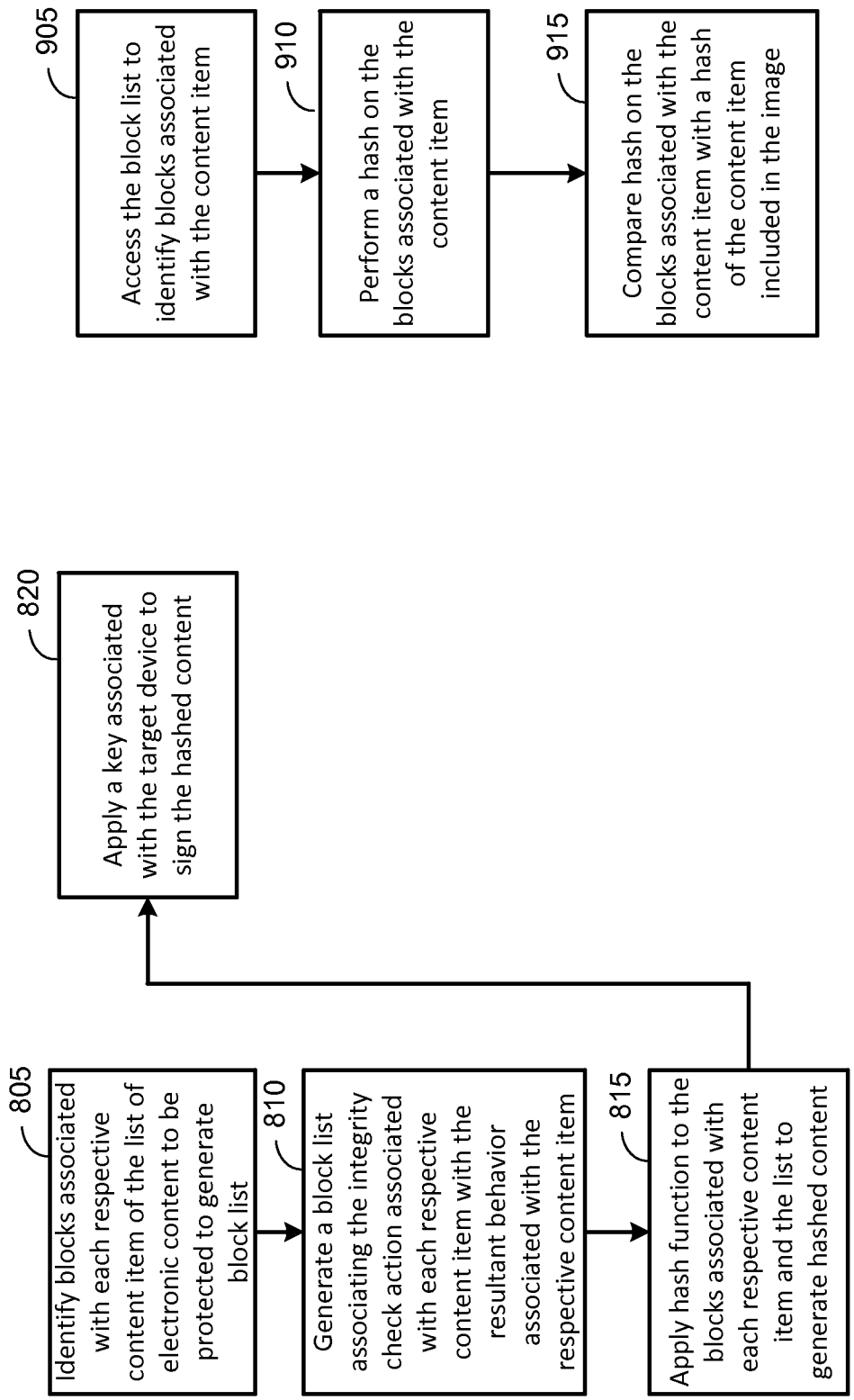

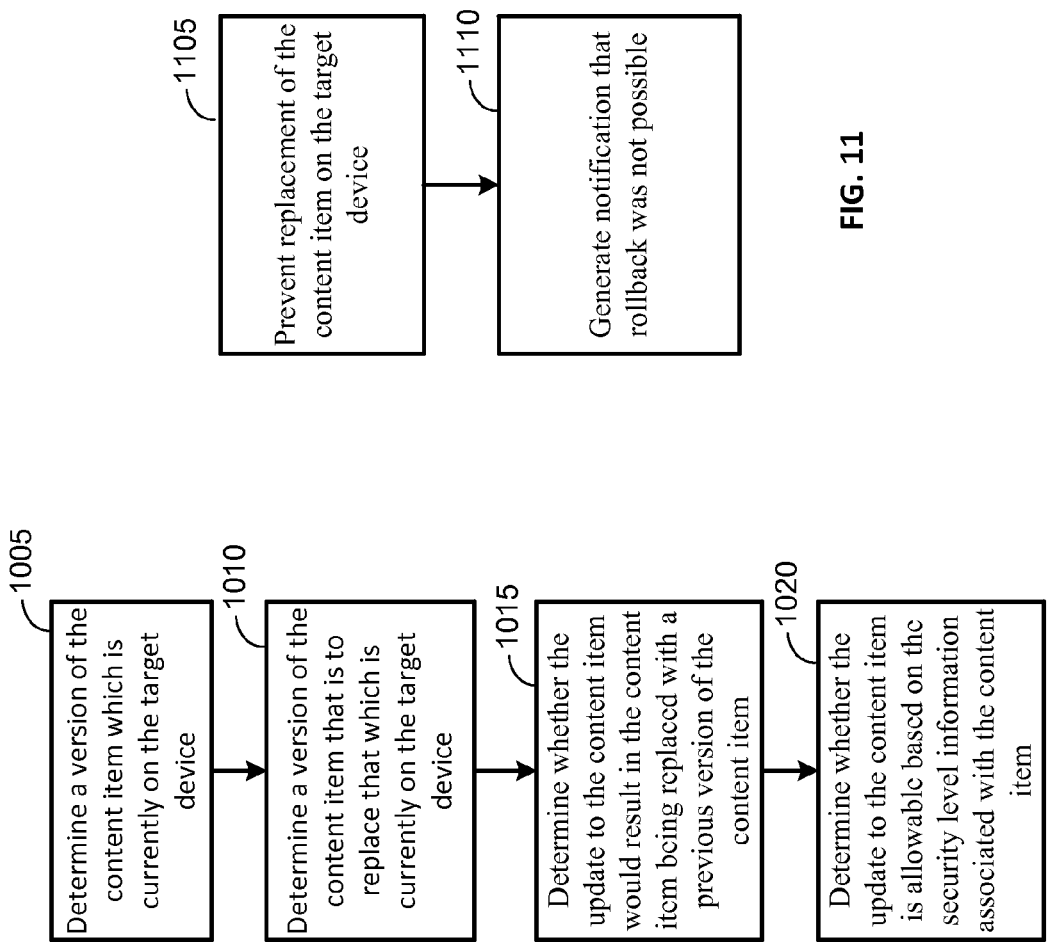

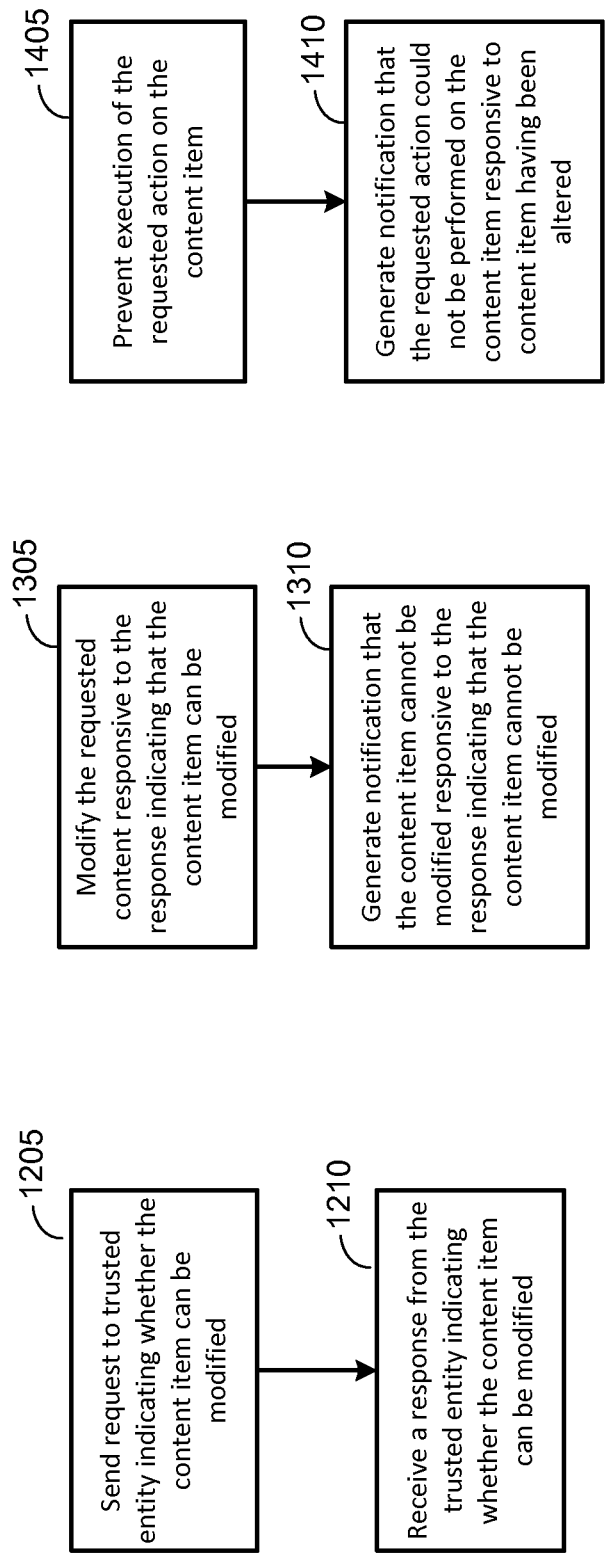

SELECTIVE BLOCK-BASED INTEGRITY PROTECTION TECHNIQUES

BACKGROUND

High-Level Operating System (HLOS) system images on production mobile devices require means for protecting the integrity of the system image. The system image includes system libraries and other files used by the HLOS that, if altered or corrupted, could result in the device malfunctioning or performing unintended/unauthorized actions. HLOS system images are typically ~5 GB on a production mobile device, and the means for protecting these images need to take into account resource constraints of the mobile device, such as memory, power, and hardware resources when implementing a protection a system image protection scheme.

Conventional solutions do not provide the level of configurability and flexibility to address the different types of content included in the system image that may need to be protected and the ability to configure an appropriate level of response when changes various types of content are identified. For example, one conventional solution offered on Android devices is "dm-verity" which provides block-based protection to all content included in the system image stored on the storage device of the mobile device. The dm-verity application builds a hash tree of all of the blocks of the system image, and checks blocks as they are accessed to determine whether they have changed by comparing their hashed content to the contents of the hast tree. An exception can be raised when a particular block of data has been changed. However, this approach is often overkill as the system image can include non-critical files, such as ringtones or other media content that, if altered, should not result in a catastrophic error. Furthermore, generating the hash tree requires significant resources. Other conventional solutions, such as Integrity Management Architecture (IMA) provide file-based protection that provides for remote attesting of file content and for local attesting of file contents by storing a hash of the file in the inode attributes of the file. But, storing this information in the inodes also requires a solution like the Linux Extended Verification Module (EVM) that validates security-sensitive extended attributes before allowing operations on files.

The conventional solutions also are limited in that they provide the same level of protection and resultant behavior from the integrity check for all types of content.

SUMMARY

A sample method for protecting contents of a computing device according to the disclosure includes receiving a request to perform an action associated with a content item included in an image, accessing security level information associated with the content item, the security level information comprising an integrity check action and a resultant behavior associated with the content item, the resultant behavior performed responsive to the integrity check action indicating that the action requested cannot be performed, performing the integrity check action associated with the content item; and performing the resultant behavior associated with the content item responsive to the integrity check action indicating that the action requested cannot be performed.

Implementations of such a method may include one or more of the following features. The resultant behavior is selected from a plurality of resultant behaviors comprising a catastrophic error handling response, an input-output (I/O) error response, a report to trusted entity response, and a rollback error response. The integrity check action is selected from a plurality of integrity check actions comprising an integrity-check-required action, no-integrity-check-required action, a rollback protection action, and a device-specific check action. Responsive to the integrity check action associated with the content item being an integrity-check-required action, performing the integrity check action associated with the content item includes: accessing a block list to identify blocks associated with the content item; performing a hash of the blocks associated with the content item; and comparing the hash of the blocks associated with the content item with a hash of the content item included in the image. Responsive to the integrity check action associated with the content item being a rollback protection action, performing integrity check action associated with the content item includes determining whether an update to the content item would result in the content item being replaced with a previous version of the content item, and performing the resultant behavior associated with the content item responsive to the integrity check action indicating that the action requested cannot be performed includes preventing the content item from being replaced with the previous version of the content item. The request to perform an action comprises a request to modify the content item, and wherein the integrity check action comprises reporting the request to a trusted entity, and wherein performing the resultant behavior comprises: receiving a response from the trusted entity indicating whether the content item can be modified; modifying the content item responsive to the response indicating that the content item can be modified; and displaying an indication that the content item cannot be modified responsive to the response indicating that the content item can be modified.

A sample apparatus for protecting contents of a computing device according to the disclosure includes means for receiving a request to perform an action associated with a content item included in an image; means for accessing security level information associated with the content item, the security level information comprising an integrity check action and a resultant behavior associated with the content item, the resultant behavior performed responsive to the integrity check action indicating that the action requested cannot be performed; means for performing the integrity check action associated with the content item; and means for performing the resultant behavior associated with the content item responsive to the integrity check action indicating that the action requested cannot be performed.

Implementations of such an apparatus may include one or more of the following features. The resultant behavior is selected from a plurality of resultant behaviors comprising a catastrophic error handling response, an input-output (I/O) error response, a report to trusted entity response, and a rollback error response. The integrity check action is selected from a plurality of integrity check actions comprising an integrity-check-required action, no-integrity-check-required action, a rollback protection action, and a device-specific check action. The integrity check action associated with the content item comprises an integrity-check-required action, and wherein the means for performing the integrity check action associated with the content item includes: means for accessing a block list to identify blocks associated with the content item; means for performing a hash of the blocks associated with the content item; and means for comparing the hash of the blocks associated with the content item with a hash of the content item included in the image.

The integrity check action associated with the content item being the rollback protection action, where the means for performing the integrity check action associated with the content item includes means for determining whether an update to the content item would result in the content item being replaced with a previous version of the content item, and where the means for performing the resultant behavior associated with the content item responsive to the integrity check action indicating that the action requested cannot be performed includes means for preventing the content item from being replaced with the previous version of the content item. The request to perform an action comprises a request to modify the content item, and the integrity check action includes reporting the request to a trusted entity, and the means for performing the resultant behavior includes: means for receiving a response from the trusted entity indicating whether the content item can be modified; and means for modifying the content item responsive to the response indicating that the content item can be modified; and means for displaying an indication that the content item cannot be modified responsive to the response indicating that the content item can be modified.

An example apparatus for protecting contents of a computing device includes a processor configured to receive a request to perform an action associated with a content item included in an image; access security level information associated with the content item, the security level information comprising an integrity check action and a resultant behavior associated with the content item, the resultant behavior performed responsive to the integrity check action indicating that the action requested cannot be performed; perform the integrity check action associated with the content item; and perform the resultant behavior associated with the content item responsive to the integrity check action indicating that the action requested cannot be performed.

Implementations of such an apparatus may include one or more of the following features. The resultant behavior is selected from a plurality of resultant behaviors comprising a catastrophic error handling response, an input-output (I/O) error response, a report to trusted entity response, and a rollback error response. The integrity check action is selected from a plurality of integrity check actions comprising an integrity-check-required action, no-integrity-check-required action, a rollback protection action, and a device-specific check action. The integrity check action associated with the content item comprises an integrity-check-required action, and wherein the processor being configured to perform the integrity check action associated with the content item is configured to: access a block list to identify blocks associated with the content item; perform a hash of the blocks associated with the content item; and compare the hash of the blocks associated with the content item with a hash of the content item included in the image. The integrity check action associated with the content item comprises the rollback protection action, and wherein the processor being configured to perform the integrity check action associated with the content item is further configured to determine whether an update to the content item would result in the content item being replaced with a previous version of the content item; and wherein the processor being configured to perform the resultant behavior associated with the content item responsive to the integrity check action indicating that the action requested cannot be performed is further configured to prevent the content item from being replaced with the previous version of the content item. The request to perform an action comprises a request to modify the content item, and wherein the processor being configured to perform the integrity check action is further configured to report the request to a trusted entity, and wherein performing the resultant behavior includes: receiving a response from the trusted entity indicating whether the content item can be modified; modifying the content item responsive to the response indicating that the content item can be modified; and displaying an indication that the content item cannot be modified responsive to the response indicating that the content item can be modified.

An example non-transitory, computer-readable medium, having stored thereon computer-readable instructions for protecting contents of a computing device according to the disclosure includes instructions configured to cause a computer to receive a request to perform an action associated with a content item included in an image; access security level information associated with the content item, the security level information comprising an integrity check action and a resultant behavior associated with the content item, the resultant behavior performed responsive to the integrity check action indicating that the action requested cannot be performed; perform the integrity check action associated with the content item; and perform the resultant behavior associated with the content item responsive to the integrity check action indicating that the action requested cannot be performed.

Implementation of such as non-transitory, computer-readable medium may include one or more of the following features. The resultant behavior is selected from a plurality of resultant behaviors comprising a catastrophic error handling response, an input-output (I/O) error response, a report to trusted entity response, and a rollback error response. The integrity check action is selected from a plurality of integrity check actions comprising an integrity-check-required action, no-integrity-check-required action, a rollback protection action, and a device-specific check action. The integrity check action associated with the content item comprises an integrity-check-required action, and wherein the instructions configured to cause the computer to perform the integrity check action associated with the content item further comprise instructions configured to cause the computer to: access a block list to identify blocks associated with the content item; perform a hash of the blocks associated with the content item; and compare the hash of the blocks associated with the content item with a hash of the content item included in the image. The integrity check action associated with the content item is the rollback protection action, and wherein the instructions configured to cause the computer to perform the integrity check action associated with the content item include instructions configured to cause the computer to determine whether an update to the content item would result in the content item being replaced with a previous version of the content; and the instructions configured to cause the computer to perform the resultant behavior associated with the content item responsive to the integrity check action indicating that the action requested cannot be performed include instructions configured to cause the computer to prevent the content item from being replaced with the previous version of the content item. The request to perform an action comprises a request to modify the content item, and the instructions configured to cause the computer to perform the integrity check action include instructions configured to cause the computer to report the request to a trusted entity, and the instructions configured to cause the computer to perform the resultant behavior include instructions configured to cause the computer to: receive a response from the trusted entity indicating whether the content item can be modified; modify the content item responsive to the response indicating that the content item can be modified; and display an indication that the content item cannot be modified responsive to the response indicating that the content item can be modified.

BRIEF DESCRIPTION OF THE DRAWINGS

FIG. 8 is a flow diagram of a process for building an image that includes security level information according to the techniques discussed herein.

FIG. 9 is a flow diagram of a process for performing an integrity check on a content item according to the techniques discussed herein.

FIG. 10 is a flow diagram of a process for determining whether a rollback of a content item to a previous version has been requested according to the techniques discussed herein.

FIG. 11 is a flow diagram of a process for performing a rollback action according to the techniques discussed herein.

FIG. 12 is a flow diagram of a process for determining whether a content item can be updated by contacting a trusted entity according to the techniques discussed herein.

FIG. 13 is a flow diagram of a process for performing a rollback action according to the techniques discussed herein.

FIG. 14 is a flow diagram of a process for performing a resultant action according to the techniques discussed herein.

DETAILED DESCRIPTION

Figure 1:
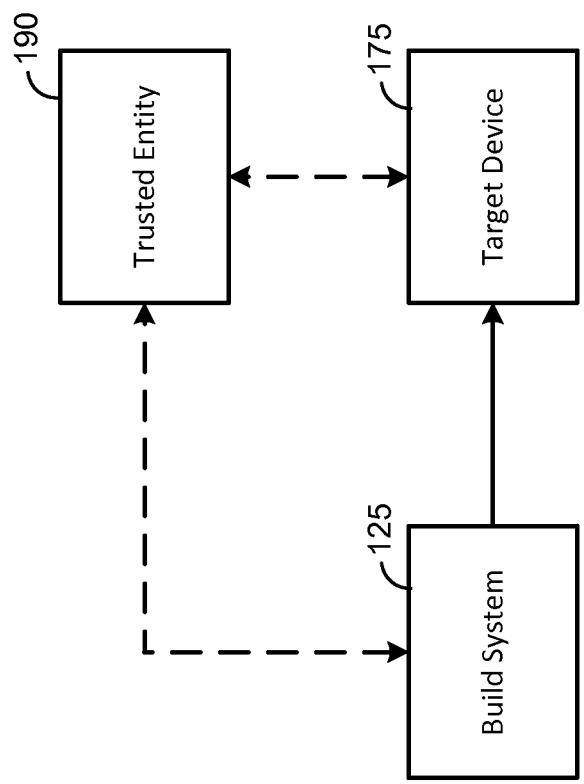
FIG. 1 is a block diagram of an example network architecture or computing environment, which may be suitable for an implementing the techniques discussed herein.

Techniques are disclosed herein for protecting the contents of a computing device are provided. The contents of the computing device can be an image or images. An image can comprise software libraries, operating system files, application content, audiovisual content (e.g., images, video content, and/or audio content), configuration files, and/or other content that may be used by a target computing device for which the image may be created. A computing device may include multiple different types of images. For example, a computing device may include a system image that includes system libraries for an operating system of the computing device, a vendor-specific image that may include vendor-specific application content and/or other vendor-specific content, a user content image that includes user-related content related to a user of the computing device. A computing device may include more than one image that includes numerous content item items, and each image and the content items included therein may be associated with different levels of protection. For example, a system image that includes operating system files might include system libraries critical to the operation of the operating system.

The computing device can be various types of computing devices, including but not limited to, laptop or other personal computer systems, tablet computers, mobile phones, game consoles, wearable devices (for example a smart watch) and/or other types of computing devices that are configured to utilize software components, configuration files, and/or other types of content items that can potentially be corrupted or modified in an unauthorized manner. For example, if a critical library of an operating system were corrupted or otherwise modified, the computing device may crash or exhibit other unwanted behavior. But, the system image also may include other types of files that, if modified, would not cause the operating system to malfunction nor would such changes indicate that any malicious modifications have been made to the computing device. For example, the system image may include log files that may be periodically updated as part of the normal functioning of the operating system. The system image may include images content that may serve as a background for a desktop or other screen of the computing device. If such an image file were modified or removed from the computing device, the integrity of the operating system would not be adversely affected.

The techniques disclosed herein allow different types of content items included in an image to be identified and associated with security level information. The security level information can include an integrity check action and a resultant behavior associated with the content item. The integrity check information can indicate one or more actions which can be performed to verify whether a content item has been changed and/or is permitted to be changed. The resultant behavior associated with the content item can indicate one or more actions which can be performed responsive to a determination that the resultant behavior should be performed responsive to the integrity check action. An image may include multiple content items. Each content item can be associated with security level information appropriate to the level of protection desired for that content item or that type of content item.

Example Network/Computing Environment

FIG. 1 is a block diagram of an example computing environment, which may be suitable for an implementing the techniques discussed herein. The particular configuration illustrated herein is merely an example of one computing environment in which the techniques disclosed herein may be used. Furthermore, an implementation of such a computing environment may include additional elements that are not illustrated herein and have been omitted for the sake of clarity.

Figure 2:
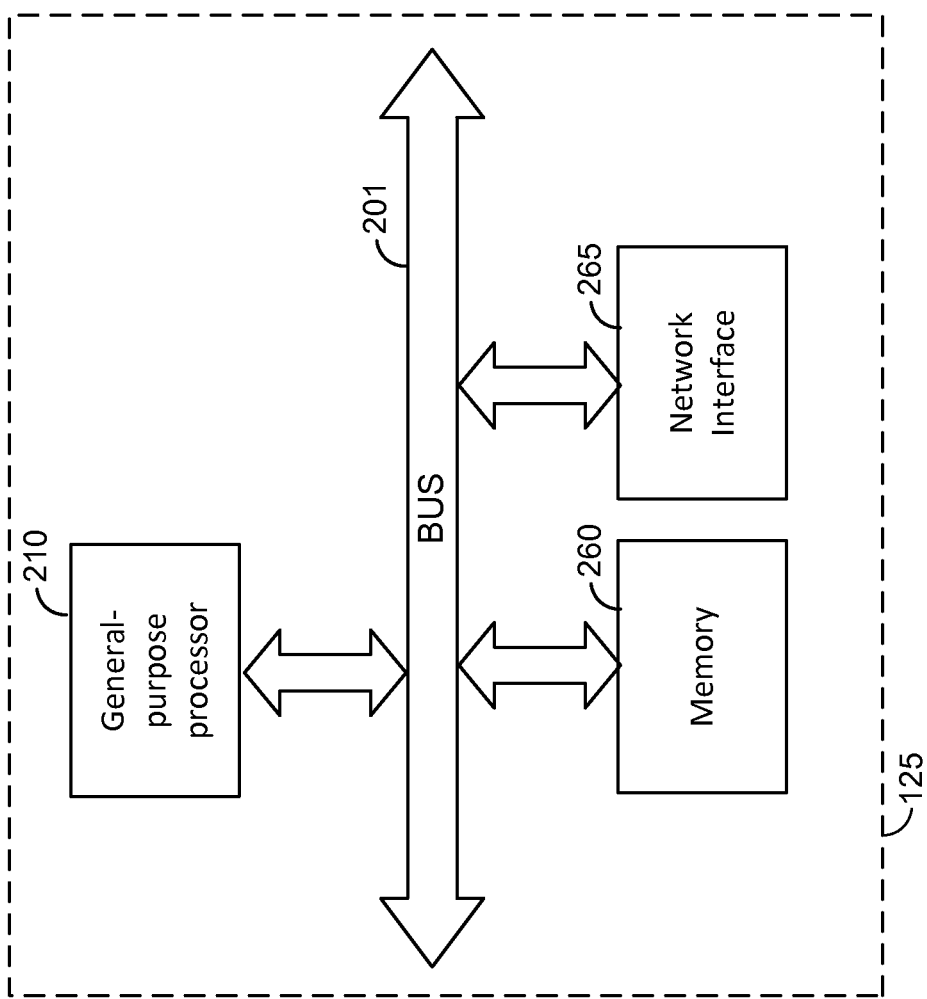
FIG. 2 is a block diagram of a computing device that can be used to implement the build system illustrated in FIG. 1.
Figure 3:
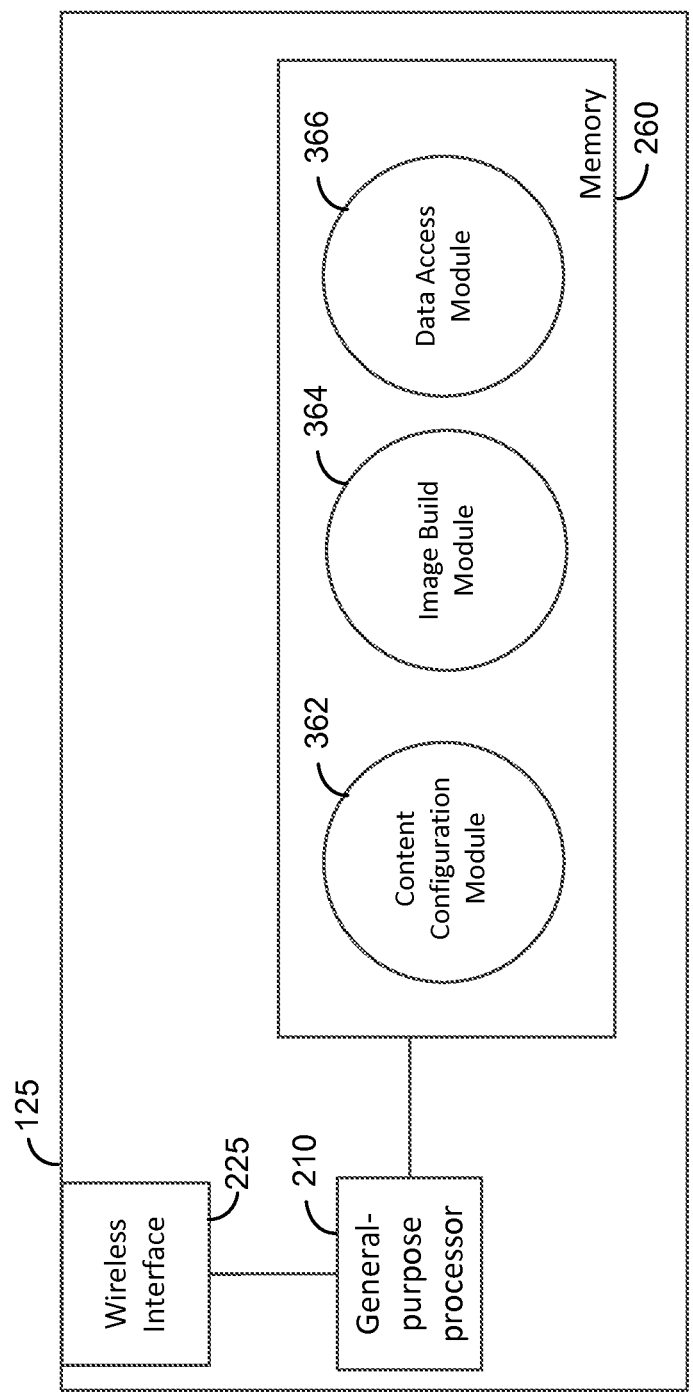
FIG. 3 is a functional block diagram of the build system illustrated in FIGS. 1-2 that illustrates functional modules of the build system shown in FIGS. 1-2.

The build system 125 can be configured to provide a user interface that allows a user to identify content to be including in a software image to be built and to associate security level information with each content item. The security level information can include an integrity check action to be performed responsive to a request for some action being taken on the content item and a resultant behavior that is executed responsive to the action requested not being able to be performed for security reasons. The build system 125 can provide means for implementing the processes illustrated at least in FIGS. 6 and 8. Examples of a computing device that can be used to implement the build system 125 are illustrated in FIGS. 2 and 3, which are discussed in detail below.

While the examples discussed herein utilize a single build system 125 to generate the image or images that are to be utilized on the target device 175, the target device 175 can be configured to receive images from multiple build systems 125. Furthermore, the target device 175 and the build system 125 may be connected to one another either directly or indirectly via a wired or wireless connection, and there may be one or more intervening systems or networks between the build system 125 and the target device 175. For example, the images generated by the build system 125 may be made available for download from a content server (not shown) that may be disposed between the build system 125 and the target device 175. For example, an operating system developer may provide one or more build images that are compatible with the target device 175, and a manufacturer or distributor of the target device 175 may download one or more images associated with the operating system to the target device 175.

The build system 125 may be operated by a manufacturer of the target device 175, a network service provider of the target device 175, a reseller of the target device 175, an application content provider of applications that can be used on the target device 175, an audiovisual content provider, and/or by an operating system provider that provides operating systems that can be utilized on the target device 175. A manufacturer or reseller of the target device 175 may include one or more images that can be used by the target device 175 and which the manufacturer or reseller wishes to limit modifications made to these images. Accordingly, the manufacturer or reseller can define security level information for the content items included in the one or more images to control how the content items may be modified. An application content provider or operating system provider can configure the security levels associated with the content items included in an image to prevent the content items included therein from being modified in a way that the application content provider or operating system provider do not permit. For example, an application content provider or operating system provider may configure the security levels associated with a content item to allow the content item to be updated to a newer version but prevent the content item from being rolled back to a previous version. The application content provider or operating system provider may configure the security level associated with a content item to prevent a user from modifying or deleting the content item. For example, the security level associated with a content item can prevent a content item from being modified, which could potentially allow a configuration file used by the application or operating system from being modified which could result in the application or operating system malfunctioning or could potentially allow a user to access content or functionality which the user is not entitled to access. A network service provider may include one or more configuration files on the mobile device that cannot be modified to prevent the device from being misconfigured or allowing a user of the device to access network services which the user is not entitled to access.

The target device 175 is a computer system that is configured to execute software content stored in a persistent memory of the target device 175. The target device 175 can be configured to receive one or more images from the build system 125 and/or from multiple build systems 125. The target device 175 can comprise a mobile device, such as a mobile phone, a tablet computer, a laptop computer, a portable gaming device, or other such device that includes a processor for executing software content included in an image. The target device 175 can also comprise a non-mobile device, such as a desktop computer system, a computer server, a set-top box, digital video recorder (DVR), a game console, or other such device that is not as readily movable as a mobile device. The target device 175 can be configured to check the security information associated with a particular content item of an image on the target device 175 responsive to a request to perform some action on that content item. The target device 175 can be configured to perform an integrity check action associated with the content item and to perform an resultant behavior associated with the content item response to the action requested not being able to be performed for security reasons (as determined by the integrity check action). The build system 125 can provide means for implementing the processes illustrated at least in FIGS. 7 and 9-13.

The trusted entity 190 is an optional entity that may be utilized to authenticate whether certain actions may be taken on content items included in a build image installed on a target device 175. The target device 175 can be configured to communicate with the trusted entity 190 via a network connection. For example, the trusted entity 190 can be configured to provide an interface that is accessible by the target device 175 over one or more networks, which may be part of the Internet. The trusted entity 190 can be configured to attest whether a version of one or more content items included in an image is an official version or is a particular version. For example, an application developer or an operating system developer may provide the trusted entity with version information and/or content information associated with one or more official versions of applications or operating system components, and the target device 175 can be configured to contact the trusted entity before performing certain actions on the content items associated with those items. For example, the target device 175 can be configured to contact the trusted entity before downloading an update to the content items or performing a rollback to a previous version of the content items.

The example network configuration or computing environment illustrated in FIG. 1 is merely an example of one possible configuration in which the techniques disclosed herein may be implemented. Other configurations may include additional elements not illustrated in FIG. 1 and the various components may be interconnected in a different configuration than what is shown in FIG. 1.

Example Hardware

FIG. 2 is a block diagram of a computing system that can be used to implement the build system 125 illustrated in FIG. 1. The build system 125 can be used to implement, at least in part, the processes illustrated in FIGS. 6 and 8.

The build system 125 comprises a computer system including a general-purpose processor 210, a non-transitory memory 260, and a network interface 265 connected to each other by a bus 201. Other implementations of the build system 125 may include additional elements not illustrated in the example implementation of FIG. 2 and/or may not include all of the elements illustrated in the example embodiment illustrated in FIG. 2.

The processor 210 can be an intelligent device, e.g., a personal computer central processing unit (CPU) such as those made by Intel® Corporation or AMD®, a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

Network interface 265 can provide a means for providing wired and/or wireless connectivity to one or more networks. The network interface 265 can allow the build system 125 to communicate with the target device 175, the trusted entity 190, and/or other entities connected to a network, such as an application service provider configured to distribute executable program content, such as application or operating system content, to a target device 175.

The software in the memory 260 is configured to enable the processor 210 to perform various actions, including implementing providing a user interface for identifying content item to be included in an image, configuring security level information for the content item, building the image, and for deploying the image to a target device 175 or to a content server.

FIG. 3 is a functional block diagram of the build system 125 illustrated in FIG. 2 that illustrates functional modules of the memory 260 shown in FIG. 2. For example, the build system 125 can include a content configuration module 362, an image build module 364, and a data access module 366. The build system 125 may also include one or more additional functional modules that provide other functionality to the build system 125. The functional modules illustrated in FIG. 3 may be implemented as software as illustrated in FIG. 3 or may be implemented in hardware or a combination of hardware and software. The build system 125 illustrated in FIGS. 2 and 3 can be used to implement the build system 125 associated with the processes illustrated in FIGS. 6 and 8. The processor 210 can also provide means for implementing the various modules of the build system 125 discussed herein and may operate in conjunction with one or more modules implemented in firmware.

The content configuration module 362 can provide means for selecting content to be included in an image. The content configuration module 362 can provide means for presenting a user interface for selecting content to a user of the build system 125 to include in an image and for defining security level information associated with the content items included in the image. The content configuration module 362 can provide means for making images for multiple types of target devices.

The image build module 364 can provide means for building an image that includes one or more content items and security level information, means for providing the built image to one or more target devices 175, means for uploading the build image to a content server for distribution and/or to a trusted entity 190 which can use the build image to verify the integrity of content items of an image one a target device 175.

The data access module 366 can be configured to store data in the memory 260 and/or other data storage devices associated with the build system 125. The data access module 366 can also be configured to access data in the memory 260 and/or other data storage devices associated with the build system 125. The data access module 366 can be configured to receive requests from other modules and/or components of the build system 125 and to store and/or access data stored in the memory 260 and/or other data storage devices associated with the build system 125.

Figure 4:
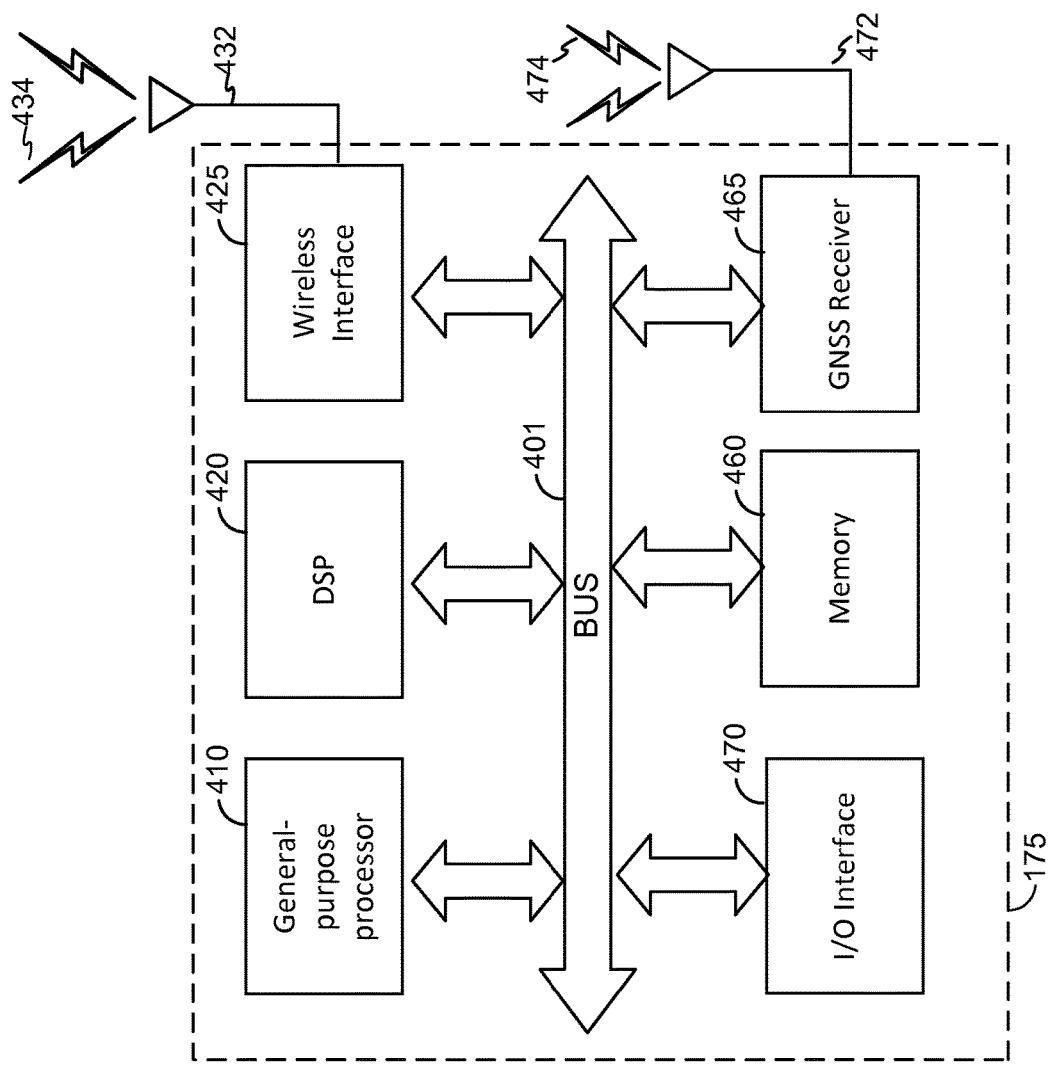
FIG. 4 is a block diagram of a computing device that can be used to implement the target illustrated in FIG. 1.

FIG. 4 is a block diagram of a computing system that can be used to implement the target device 175 illustrated in FIG. 1. The target device can be used to implement, at least in part, the processes illustrated in FIGS. 7 and 9-14.

The target device 175 comprises a computer system including a general-purpose processor 410, a digital signal processor (DSP) 420, a wireless interface 425, a GNSS interface 465, and a non-transitory memory 460, connected to each other by a bus 401. Other implementations of the target device 175 may include additional elements not illustrated in the example implementation of FIG. 4 and/or may not include all of the elements illustrated in the example embodiment illustrated in FIG. 4. For example, some implementations of the target device 175 may not include the GNSS interface 465, the DSP 420, and/or the wireless interface 425.

The wireless interface 425 can include a wireless receiver, transmitter, transceiver, and/or other elements that enable the target device 175 to send and/or receive data using WWAN, WLAN, and/or other wireless communication protocols. The wireless interface 425 can comprise one or more multi-mode modems capable of transmitting and receiving wireless signals using multiple wireless communications standards. The wireless interface 425 is connected by a line 432 to an antenna 434 for sending and receiving communications to/from wireless devices configured to communicate using wireless communication protocols. While the target device 175 illustrated in FIG. 4 comprises a single wireless interface 425 and a single antenna 434, other implementations of the target device 175 can include multiple wireless interfaces 425 and/or multiple antennas 434.

I/O interface 470 can provide one or more ports and/or other interfaces that can provide for data inputs and/or outputs to the target device 175. For example, the I/O interface 470 can include one or more ports, such as a Universal Serial Bus (USB) port and/or other type of port that can be used to connect external devices to the mobile device. The I/O interface 470 can also include one or more input devices, such as buttons, switches, a keypad, a touchscreen and/or other means for receiving input from a user. The I/O interface 470 can also include one or more means for outputting audio and/or visual content, such as a screen, a speaker, a headphone port and/or other means for outputting such content.

The GNSS interface 465 can include a wireless receiver and/or other elements that enable the target device 175 to receive signals from transmitters associated with one or more GNSS systems. The GNSS interface 465 is connected by a line 472 to an antenna 474 for receiving signals from the GNSS transmitters. The target device 175 can be configured to use signals received from satellites associated with satellites and other transmitters associated with the GNSS systems to determine a position of the target device 175. The target device 175 can also be configured to use the signals received from the satellites and other transmitters associated with the GNSS systems in conjunction with signals received from other wireless devices.

The DSP 420 can be configured to process signals received from the wireless interface 425 and/or the GNSS interface 465 and may be configured to process signals for or in conjunction with one or more modules implemented as processor-readable, processor-executable software code stored in memory 460 and/or can be configured process signals in conjunction with the processor 410.

The processor 410 can be an intelligent device, e.g., a personal computer central processing unit (CPU) such as those made by Intel® Corporation or AMD®, a microcontroller, an application specific integrated circuit (ASIC), etc. The memory 460 is a non-transitory storage device that can include random access memory (RAM), read-only memory (ROM), or a combination thereof. The memory 460 can store processor-readable, processor-executable software code containing instructions for controlling the processor 410 to perform functions described herein (although the description may read that the software performs the function (s)). The software can be loaded onto the memory 460 by being downloaded via a network connection, uploaded from a disk, etc. Further, the software may not be directly executable, e.g., requiring compiling before execution.

The software in the memory 460 is configured to enable the processor 410 to perform various actions, including implementing sending and/or receiving data from devices configured for wireless communication.

Figure 5:
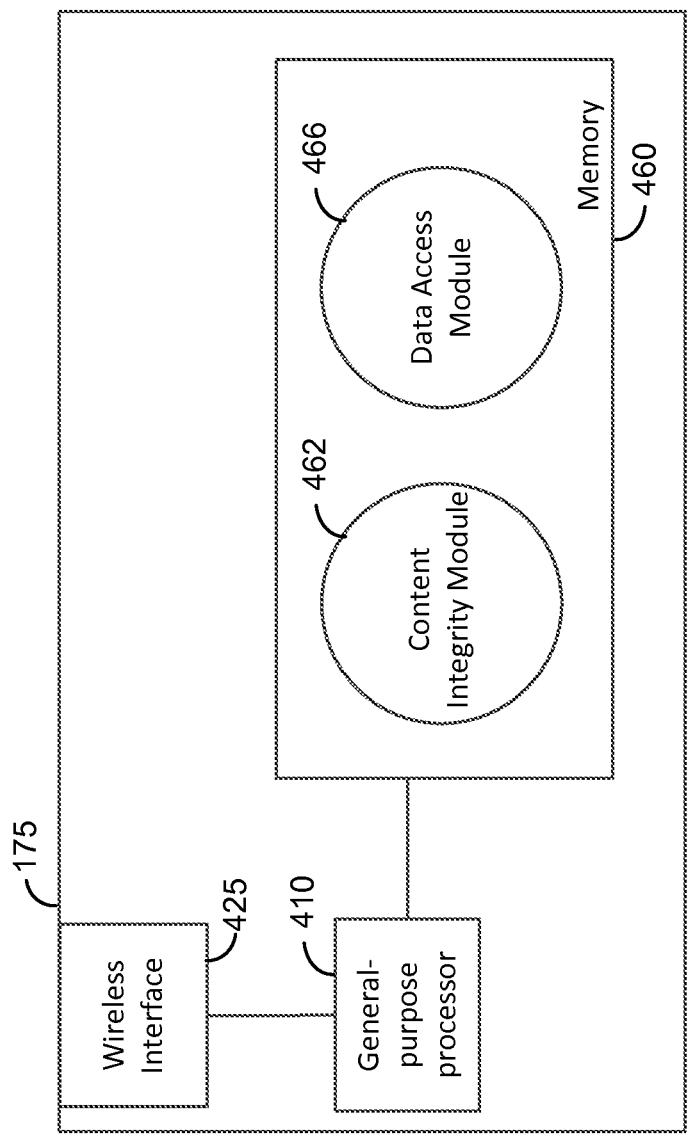
FIG. 5 is a functional block diagram of the target device illustrated in FIGS. 1 and 4 that illustrates functional modules of the build system shown in FIGS. 1 and 4.

FIG. 5 is a functional block diagram of the target device 175 illustrated in FIG. 4 that illustrates functional modules of the memory 460 shown in FIG. 4. For example, the target device 175 can include a content integrity module 462 and a data access module 466. The target device 175 may also include one or more additional functional modules that provide other functionality to the target device 175. The functional modules illustrated in FIG. 5 may be implemented as software as illustrated in FIG. 5 or may be implemented in hardware or a combination of hardware and software. The target device 175 illustrated in FIGS. 4 and 5 can be used to implement the target device 175 associated with the processes illustrated in FIGS. 7 and 9-14. The processor 410 can also provide means for implementing the various modules of the target device 175 discussed herein and may operate in conjunction with one or more modules implemented in firmware.

The content integrity module 462 can provide means for accessing security level information associated with a content item included in an image on the target device 175, and means for performing one or more integrity check actions and one or more resultant behaviors included in the security level information associated with the content item. The content integrity module 462 can be configured to provide means for performing the various actions associated with the processes illustrated in FIGS. 7 and 9-14 unless otherwise specified.

The data access module 466 can be configured to store data in the memory 460 and/or other data storage devices associated with the target device 175. The data access module 466 can also be configured to access data in the memory 460 and/or other data storage devices associated with the target device 175. The data access module 466 can be configured to receive requests from other modules and/or components of the target device 175 and to store and/or access data stored in the memory 460 and/or other data storage devices associated with the target device 175.

Example Implementations

Figures 6, 7:
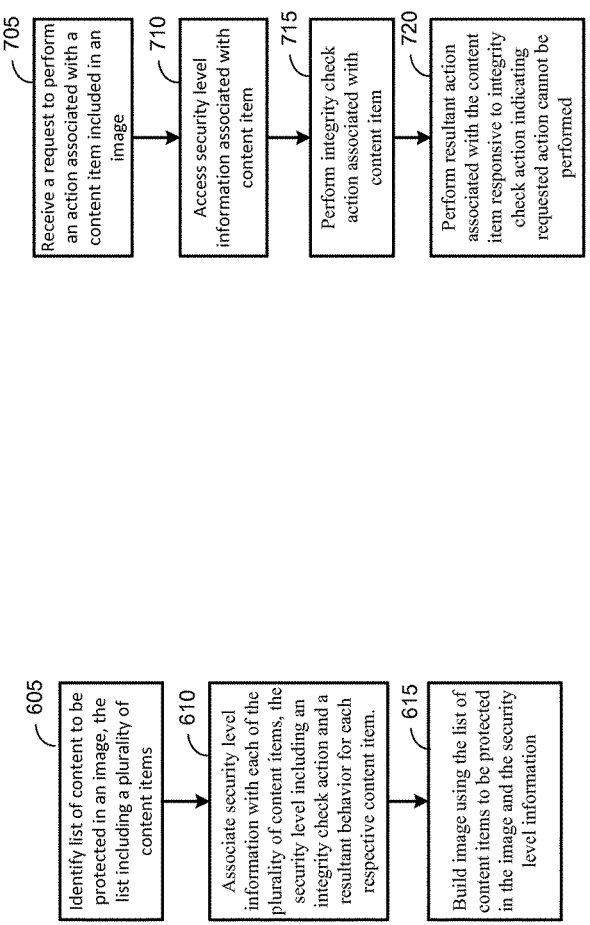
FIG. 6 is a flow diagram of a process for building an image and associating content items in that image with a security level according to the techniques discussed herein.
FIG. 7 is a flow diagram of a process for performing an integrity check on a content item in an image responsive to a request to perform an action associated with the content item according to the techniques discussed herein.

FIG. 6 is a flow diagram of a process for building an image and associating content items in that image with a security level according to the techniques discussed herein. The process illustrated in FIG. 6 can be implemented using the build system 125. The content configuration module 362 and/or the image build module 364 of the build system 125 can provide means for performing the various stages included in the process illustrated in FIG. 4 unless otherwise specified.

A list of content items to be protected as part of an image can be identified (stage 605). The list can include a list of content items that are to be included in the image. The content items may include one or more types of content to be protected. For example, the content items may include one or more of software libraries, operating system files, application content, audiovisual content, configuration files, and/or other content that may be used by a target computing device. The content items to be included in the image can depend on the type of image being created and/or the type of target device for which the image is being created. The content configuration module 362 of the build system 125 can be configured to provide a user interface that allows a user to select content items to be included in an image. The user interface can also provide an interface that allows the user to configure an image for multiple types of target devices, multiple operating systems, and/or multiple different software version and/or operating system versions. For example, a particular application may be deployed on different types of target devices, such as tablet computers, mobile phones, and laptop or desktop computer systems. A particular application may also be configurable for different operating systems that require different libraries and/or configuration files associated with the application content. The application may also be offered in different versions, such as regular version and a professional version that include different content. The user interface provided by the content configuration module 362 of the build system 125 can allow a user to select content items associated with different versions of an image, such as but not limited to the examples discussed herein.

Security level information can then be associated with each of the content items (stage 610). The security level information can include an integrity check action and a resultant behavior for each respective content item. The integrity check action can define one or more steps that can be performed to determine whether the content item associated with the integrity check action has been altered in a way that is not allowed according to the integrity check action. If the content item has been altered in a way that is not allowed according to the integrity check action, the resultant behavior associated with the content item can be performed. The integrity check action may be performed by the build system 125 to verify the integrity of an image that is be provided to a target device 175, a trusted entity 190, and/or a content provider. The target device 175 can also be configured to perform the integrity check action associated with the content item. For example, the target device 175 can be configured to perform the integrity check action on a content item in response to the target device 175 being booted up or powered up. The target device 175 can also be configured to perform the integrity check action in response to the content item associated with the integrity check action being requested, accessed, and/or modified by some process being executed on the target device 175. For example, the target device 175 can be configured to perform the integrity check action associated with a content item in response to the content items being accessed by application running on the target device 175.

The integrity check action may be selected from a set of integrity check actions. For example, the set of integrity check actions can include an integrity-check-required action, a no-integrity-check-required action, a rollback protection action, and a device-specific check action. The integrity-check-required action can be associated with a content item to indicate that an integrity check of the content item is required. The specific implementation of the integrity check can vary from implementation to implementation. Examples of such an integrity check are illustrated in FIGS. 9, 10, and 12. Content items which are associated with the integrity-check-required action can be associated with a resultant behavior that is appropriate for the type of content being protected. Some examples of such resultant behaviors will be discussed in detail below. The no-integrity-check-required action can be associated with a content item to indicate that no integrity check of the content item is required. The no-integrity-check-required action can be used to identify content items which are not critical to the operation of the target device 175, such as audiovisual content, or files which are expected to be updated periodically after the image is created, such has log files. Content items which are associated with the no-integrity-check-required action may also be associated with resultant behaviors that perform no action or that notify a user of the target device 175 and/or a content provider if the content item is modified. The rollback protection action can be associated with content items which cannot be permitted to be replaced with a previous version of the content item. For example, an application content provider may associate the rollback protection action with content items required for an application to operate correctly on a target device 175 to prevent a user of the target device 175 from rolling the application content back to a previous version that may no longer be supported or may not work properly with other software present on the target device 175. In another example, an operating system developer may associate the rollback protection action with a content item that includes functionality that is required for the operating system to operate properly on the target device 175.

The example integrity check actions discussed herein are intended to demonstrate some examples of the types of integrity check actions that may be included in a particular implementation. Other types of actions in addition to or instead of those discussed in the example discussed above may be included in other implementations. A content item can be associated with multiple integrity check actions and resultant behaviors. For example, a content item may be associated with a first integrity check action and an associated first resultant behavior to be performed responsive to the first integrity check action indicating that the resultant behavior associated with that integrity check should be performed and with a second integrity check action and an associated second resultant behavior to be performed responsive to the second integrity check action indicating that the resultant behavior associated with the integrity check action should be performed.

The resultant behavior may be selected from a set of resultant behaviors. For example, the set of resultant behaviors can include a catastrophic error handling response, an input-output (I/O) error response, a report to trusted entity response, and a rollback error response. The catastrophic error handling response can be associated with content items which, if altered, can adversely affect the operation of the target device 175 and/or potentially damage the target device 175 and/or the data stored thereon. For example, the catastrophic error handling response may be associated with operating system libraries and/or other such content included in an image that are critical to the operation of the target device 175. The input-output (I/O) error response can be associated with content items that, if altered, can adversely affect the operation of applications or other features of the target device 175 that are not critical to the operation of the target device 175. For example, a content item associated with the operation of a particular application included in an image may be associated with the input-output (I/O) error response resultant behavior, which can be used to terminate the operation of the application if the content item is altered in a way that is not permitted by the integrity check action associated with that content item. The operation of the target device 175 should not be affected by the altered content item and can continue once the application associated with the content item has been terminated. The report to trusted entity response can be associated with content items which, if altered, a trusted entity should be notified that the content item has been altered. For example, the report to trusted entity response may be associated with a key or other credentials associated with the target device 175. For example, the target device 175 may be a mobile device, and the report to trusted entity response may be associated with one or more configuration files, which if altered, could result in the mobile device malfunctioning and/or could indicate that the mobile device may have been stolen or is otherwise being used in an unauthorized fashion. If the content item is determined to have been altered, the target device 175 can be configured to send a message to the trusted entity indicating that the content item has been altered.

The example resultant behaviors discussed herein are intended to demonstrate some examples of the types of resultant behaviors that may be included in a particular implementation. Other types of resultant behaviors in addition to or instead of those discussed in the examples discussed above may be included in other implementations.

The image can then be built using the list of content item to be protected in the image and the security level information (stage 615). The image build module 364 of the build system 125 can generate the image for the target device 175 such that the image includes the security level information associated with the content items included in the image. The security level information can be included in file index node ("inode") attributes or other data structures that can be used to store metadata information about content items included in an image. The metadata information for a content item can be used to store information that identifies which blocks of data are associated with the content item. The metadata information can be used to store the security level information for the content item as well. The metadata information can include one or more integrity check actions and resultant behaviors associated with the content item. In some implementations, the integrity check actions and the resultant behaviors can be defined in a security level information content item included with the image and the security level information associated with each content item can be configured to reference the integrity check action and resultant behavior information included in the security level information content item. The specific data structures used to store the security level information associated with the content items can vary depending on the configuration of the target device 175 for which the image is intended, and the build system 125 can be configured to build multiple images for multiple different target device configurations.

FIG. 7 is a flow diagram of a process for performing an integrity check on a content item in an image responsive to a request to perform an action associated with the content item according to the techniques discussed herein. The process illustrated in FIG. 7 can be implemented using the target device 175. The content integrity module 462 of the target device 175 can provide means for performing the various stages included in the process illustrated in FIG. 7 unless otherwise specified.

Receive a request to perform an action associated with a content item included in an image (stage 705). The content integrity module 462 of the build system 125 can be configured to receive a request to perform an action associated with a content item include in an image installed on the target device 175. The processor 410 of the target device 175 can be configured to forward a request to perform an action on a content item included in an image to the content integrity module 462. For example, an application being executed by the processor 410 of the target device 175 may send a request to the processor 110 to perform an action on a content item that is included in an image installed in a memory of the target device 175. In some implementations, the processor 410 can configured to send all requests to perform an action that attempts to update, delete, or otherwise modify a content item stored in a memory of the target device 175 to the content integrity module 462, and the content integrity module 462 can be configured to determine whether the content item is associated with a secured image stored on the mobile device.

The requested action to be performed on the content item may be to read or access the content item or may be to modify the content item. The security level information can also specify whether a content item may be modified. The security level information associated with the content item may require that the integrity of the content item be verified even before performing a read-only access of the content item. For example, a content item may include an executable program library which the processor 410 of the target device 175 can access and execute. To ensure that the executable program library has not been altered, the content item may include an integrity check action that verifies that the content item has not been modified since it built by performing hash on one or more blocks of data of the content item and comparing them to a hash of the same blocks that was performed by the build system 125.

Security level information associated with content item can be accessed (stage 710). The content integrity module 462 can be configured to access security level information stored in the image to determine a security level associated with the content item. The security level information can include an integrity check action and a resultant behavior associated with the content item. As discussed above, the security level information can be stored as metadata in inodes or other data structures associated with content item. In some implementations, the security level information stored in the metadata can reference content of a security level information content item which identifies the actions to be performed for the integrity check action and/or the resultant behavior. In other implementations, the content integrity module 462 can include information or access security level information from the memory 460 that can be used to determine which steps should be performed for an integrity check action or resultant behavior included in the security level information included with the image.

An integrity check action associated with content item can be performed (stage 715). The content integrity module 462 can be configured to perform the integrity check action associated with the content item. The integrity check action can define one or more steps that may be performed to determine whether the content item associated with the integrity check action has been altered in a way that is not allowed according to the integrity check action. The content integrity module 462 can be configured to compare information associated with one or more blocks of a content item with reference information reflecting expected contents of the one or more blocks of the content item to determine whether the content item has been altered. For example, the content integrity module 462 can be configured to determine a hash value for one or more blocks of the content item and compare the hash value associated with each block with a reference hash value to determine whether the content item has been altered. The content integrity module 462 can also be configured to use a trusted entity 190 to determine whether the content item has been altered in a way that is not permitted. For example, the content integrity module 462 can be configured to determine hash values associated with one or more blocks of the content item to the trusted entity 190 to determine whether the content item has been altered in a way that is not permitted according to the security level associated with the content item.

FIGS. 9, 10, and 12 illustrate example processes that can be used to perform an integrity check action for a content item. The content integrity module 462 can be configured to perform other processes for performing an integrity check in other implementations and is not limited to the example processes illustrated in FIGS. 9, 10, and 12.

Resultant behavior associated with content item can be performed responsive to integrity check action indicating requested action cannot be performed (stage 720). If the content item has been altered in a way that is not allowed according to the integrity check action, the resultant behavior associated with the content item can be performed. The content integrity module 462 can be configured to perform various types of resultant behaviors. The resultant behavior may be selected from a set of resultant behaviors, such as a catastrophic error handling response, an input-output (I/O) error response, a report to trusted entity response, and a rollback error response. The type of resultant behavior to be performed can be defined by the security level information associated with the content item. The resultant behavior can be selected based on how critical the content item to the functioning of the target device 175 and/or one or more applications or components of the target device 175. The content integrity module 462 can be configured to terminate the execution of an application or module of the target device 175, terminate operation of the operating system or operating system component of the target device 175, terminate operation of the target device 175, and/or send a notification to a trusted entity or other third party that the content item has been altered in an impermissible way. In some implementations, the content integrity module 462 can be configured to obtain a replacement copy of a content item from a trusted entity in response to the content integrity module 462 determining that the content item has been altered. For example, a network service provider may include one more applications and/or configuration data in an image stored on the target device 175, and the content integrity module 462 can be configured to obtain replacement copies of these content items responsive to determining that these content items have been altered.

FIGS. 11, 13, and 14 illustrate example processes that can be used to perform a resultant behavior for a content item. The content integrity module 462 can be configured to perform other processes for performing a resultant behavior in other implementations and is not limited to the example processes illustrated in FIGS. 11, 13, and 14.

FIG. 8 is a flow diagram of a process for building an image that includes security level information according to the techniques discussed herein. The process illustrated in FIG. 8 can be implemented using the build system 125. The content configuration module 362 and/or the image build module 364 of the build system 125 can provide means for performing the various stages included in the process illustrated in FIG. 8 unless otherwise specified. The process illustrated in FIG. 8 can be used to implement stage 615 of the process illustrated in FIG. 6.

Blocks associated with each respective content item of the list of content item to be protected can be identified to generate a block list (stage 805). The content items associated with the target that were identified in stage 605 may be broken up into one or more blocks of data that comprise the image. The blocks of data associated with each of the content items included in the image can be added to a block list. The block list can later be used to determine which blocks are associated with a particular content item and which security level (if any) has been associated with a particular content item.

The block list can be updated to include the integrity check action and the resultant behavior associated with each respective content item (stage 810). The security level information associated with each of the content items included in the image in stage 610 can be associated with each of the respective blocks of the content items, such that the integrity protection action and the resultant behavior associated with a respective content item is associated with each of the blocks of that content item.

A hash function can be applied to the blocks associated with each respective content item and the list to generate hashed content (stage 815). A hash function can be applied to each of the blocks associated with each content item, and the hash value associated with each block can be added to the block list information associated with the image. The hash function can later be used to determine whether a particular block of content of a content item has been modified.

A key associated with the mobile device can be applied to sign the hashed content (stage 820). The build system 125 can be configured to sign the block list using a key associated with the target device 175. For example, the key may comprise a private encryption key associated with target device 175 to which the build system 125 and the target device 175 have access but should otherwise be kept unknown or unavailable. The target device 175 can use the key to determine that the signed block list has not been altered or corrupted. A malicious party or software attempting to modify the block list to alter the contents of the image would be extremely unlikely to be able to alter the block list without access to the key associated with the target device 175. The key may be stored in a memory of the target device 175 that is substantially inaccessible to unauthorized applications on the target device 175 to minimize the likelihood that the key could be obtained by an unauthorized third party. The hash values can be stored in metatdata information included in the inodes or other data structures associated with the content items. The metadata information associated with the content items can be stored as read-only content that cannot be modified once built to prevent manipulation of the image content in an attempt to thwart the security level information associated with the content items.

FIG. 9 is a flow diagram of a process for performing an integrity check on a content item according to the techniques discussed herein. The process illustrated in FIG. 9 can be implemented using the target device 175. The content integrity module 462 of the target device 175 can provide means for performing the various stages included in the process illustrated in FIG. 9 unless otherwise specified. The process illustrated in FIG. 9 can be used to implement stage 715 of the process illustrated in FIG. 7.

The block list can be accessed to identify blocks associated with the content item (stage 905). A block list that associates one or more blocks of data with each of the content items of an image can be accessed. The block list can be stored with or as part of the contents of the image and can be accessed by the content integrity module 462. In some implementations, metadata stored in an inode or other data structure associated with the content item can include a list of blocks associated with each content item. The operating system or other component of the build system 125, such as the image build module 364, can be configured to store this information in the inode or other such data structure. In other implementations, the blocks associated with a content item may be stored in a file or other content item included with the image, and the content integrity module 462 can be configured to access the file or other content item and access the block information associated with the content item stored therein.

A hash can be performed on the blocks associated with the content item (stage 910). The content integrity module 462 can be configured to apply a hash algorithm to one or more of the blocks associated with the content item. The content integrity module 462 can be configured to use the same hash algorithm applied by the build system 125 when building the image. The content integrity module 462 can be configured to apply the hash algorithm to a subset of the blocks comprising the content item or to all of the blocks comprising the content item. The build system 125 can be configured to apply the hash algorithm to each of the blocks of the content item and to store a read-only copy of the hash values in the image.

The hash on the blocks associated with the content item can be compared with a hash of the content item included in the image (stage 915). The content integrity module 462 can be configured to compare the hash of the each of the blocks of the content item determined by the content integrity module 462 with the hash of the each of these respective blocks of the content item stored in the image to determine whether the content item has been modified. If the content item has been modified, the resultant behavior associated with the content item can be performed in stage 720 of the process illustrated in FIG. 7.

FIG. 10 is a flow diagram of a process for determining whether a rollback of a content item to a previous version has been requested according to the techniques discussed herein. The process illustrated in FIG. 10 can be implemented using the target device 175. The content integrity module 462 of the target device 175 can provide means for performing the various stages included in the process illustrated in FIG. 10 unless otherwise specified. The process illustrated in FIG. 10 can be used to implement stage 715 of the process illustrated in FIG. 7. A rollback may be triggered by an application on the target device 175 and/or in response to a user request to rollback a particular content item or content items. The rollback process may include performing the process illustrated in FIG. 10 for multiple content items associated with a particular application, operating system, or other content on the target device 175. The content integrity module 462 can be configured to execute the rollback process illustrated in FIG. 10 any time that a content item that has a rollback protection integrity check action associated with it is attempted to be modified or deleted, which can be used to determine whether the modification is an attempt to replace the content item with a version of the content item that is allowable.

A version of the content item which is currently on the target device can be determined (stage 1005). The content integrity module 462 can be configured to determine a version of the content item that is currently stored on the target device 175. The security information associated with the content item can include version information that the content integrity module 462 can use to determine the current version of the content item. The content integrity module 462 can also be configured to determine the version of the content item based on a hash of the content item, and/or by transmitting the hash of the content item and/or the content item to a trusted entity 190 to determine the version of the content item.

Determine a version of the content item that is to replace that which is currently on the target device (stage 1010). The content integrity module 462 can be configured to determine a version associated with the content item that is to replace that which is currently on the target device 175. The request to perform the action on the content item received in stage 715 can include version information for the content item to replace that which is to be replaced on the target device 175. For example, a user may have attempted to download and/or install content onto the target device 175 that includes a version of the content item which may be different from what which is already found on the target device 175. The content integrity module 462 can be configured to determine a version of the content item that is present in the content that is to be installed and/or downloaded to the device. The version of the content item to be downloaded can be stored in the security information associated with the content to be installed and/or downloaded to the target device 175. The content integrity module 462 can be configured to prevent the download and/or installation of the content item if the content integrity module 462 cannot verify the version information for the content item. For example, if the security level information associated with the content item to replace that which is already on the target device 175 is missing and/or corrupted, the content integrity module 462 can be configured to prevent the content item on the target device 175 from being replaced by the content item.

A determination whether the update to the content item would result in the content item being replaced with a previous version of the content item can be made (stage 1015). The content integrity module 462 can be configured to compare the version of the content item stored on the target device with the version of the content item with which the content item is to be updated to determine whether the replacement version of the content item is an earlier version of the content item than that which is currently stored on the target device 175. If no version information could be determined for the version of the content item to replace that which is currently on the target device 175, the content integrity module 462 can be configured to prevent the other version of the content item from replacing that which is already on the target device 175.

A determination whether the update to the content item is allowable based on the security level information associated with the content item can be made (stage 1020). The content integrity module 462 can be configured prevent a content item from being replaced with a previous version of the content item if the integrity action associated with the security level information for the content item indicates that a rollback of the version is not permitted. The content integrity module 462 can also be configured to prevent the replacement of the content item if the version of the content item on the target device 175 or the content item which is to replace the content item on the target device 175 cannot be determined. The content integrity module 462 can also be configured to prevent a content item from being replaced with a different version of a content item. For example, an application provider, a network service provider, an operating system provider, or other content provider may set a security level associated with a content item such that the version of the content item cannot be changed, but the same version of the content item may be downloaded and/or installed on the target device 175 again.

FIG. 11 is a flow diagram of a process for performing a rollback action according to the techniques discussed herein. The process illustrated in FIG. 11 can be implemented using the target device 175. The content integrity module 462 of the target device 175 can provide means for performing the various stages included in the process illustrated in FIG. 11 unless otherwise specified. The process illustrated in FIG. 11 can be used to implement stage 720 of the process illustrated in FIG. 7. The process illustrated in FIG. 11 can be implemented as a resultant action that can be executed responsive to a determination in stage 1020 of the process illustrated in FIG. 12 that the update to the content item is not allowable.

Replacement of the content item on the target device can be prevented (stage 1105). The content integrity module 462 can be configured to prevent the content item from being replaced with another version of the content item. The content integrity module 462 can be configured to prevent the rollback of the content item to a previous version when such a rollback is not permitted according to the integrity check action associated with the security level information associated with the content item. The content integrity module 462 can also be configured to prevent the content item from being replaced with another version of the content item where the version of the content item which was to replace that currently on the target device 175 could not be determined. The content integrity module 462 can be configured to halt the download and/or installation of the version of the content item which was to replace that currently available on the target device 175.

Notification that the rollback of the version of the content item was not possible can be generated (stage 1110). The content integrity module 462 can be configured to generate notification that the replacement of the content item on the target device 175 was not permitted can be generated. The content integrity module 462 can be configured to generate a message or another notification on a display of the target device 175 that can notify a user of the target device 175 that that the content item 175 could not be replaced. The message or other notification can include information indicating whether the rollback to a previous version could not be performed due to security level information associated with the content item. The content integrity module 462 can be configured to send a notification to a process or application being executed on the target device 175 that attempted to download and/or install a new version of the content item on the target device 175. The content integrity module 462 can be configured to generate a log entry on the target device 175 that includes information identifying the content item, the version of the content item on the target device 175, version information for the replacement for the content item that was attempted to be downloaded and/or installed on the target device 175, timestamp information indicating when the event occurred, and/or other information. The log entry may be included in a security log generated by the content integrity module 462, which can provide a history of integrity check actions and resultant behaviors performed on the target device 175.

FIG. 12 is a flow diagram of a process for determining whether a content item can be updated by contacting a trusted entity 190 according to the techniques discussed herein. The process illustrated in FIG. 12 can be implemented using the target device 175. The content integrity module 462 of the target device 175 can provide means for performing the various stages included in the process illustrated in FIG. 12 unless otherwise specified. The process illustrated in FIG. 12 can be used to implement stage 715 of the process illustrated in FIG. 7. The trusted entity 190 may be associated with an application content provider, an operating system provider, a network service provider associated with the target device 175, and/or another entity that can verify whether a content item can be modified.

Send request to trusted entity indicating whether the content item can be modified (stage 1205). The content integrity module 462 can be configured to send the request to the trusted entity 190 via a wired and/or wireless network connection. The request may be routed over one or more networks, which may include the Internet, to the trusted entity 190. The request can include information identifying the content item which is to be modified. The request can also include information identifying the target device 175 and/or information identifying a configuration of the target device 175. For example, the configuration information can include information identifying hardware and/or software components of the target device 175. The information identifying software components of the target device 175 can include information identifying a version of one or more operating systems included on the target device 175. The request can include version information that identifies a version of the content item to be modified. The request can include version information of a content item to replace the content item if the request is related to replacement or rollback of the content item with a different version of the content item.

A response can be received from the trusted entity indicating whether the content item can be modified (stage 1210). The response can include an indication whether the content item can be modified, and can include information indicating why the content item cannot be modified should the trusted entity 190 determine that the content item cannot be modified. The content integrity module 462 can be configured to use the information included in the response to determine whether the content item can be modified and to perform an appropriate resultant action. FIG. 11 illustrates a process in which the content integrity module 462 can perform a resultant action based on the contents of the response received from the trusted entity 190.

FIG. 13 is a flow diagram of a process for performing a rollback action according to the techniques discussed herein. The process illustrated in FIG. 13 can be implemented using the target device 175. The content integrity module 462 of the target device 175 can provide means for performing the various stages included in the process illustrated in FIG. 13 unless otherwise specified. The process illustrated in FIG. 13 can be used to implement stage 720 of the process illustrated in FIG. 7.

The requested content can be modified responsive to the response indicating that the content item can be modified (stage 1305). The content integrity module 462 can be configured to allow the content item to be modified responsive to the indication included in the response received from the trusted entity indicating that the content item can be modified.

A notification can be generated that the content item cannot be modified responsive to the response indicating that the content item cannot be modified (stage 1310). The content integrity module 462 can be configured to prevent the content item from being modified responsive to the indication included in the response received from the trusted entity indicating that the content item cannot be modified.

The content integrity module 462 can be configured to generate a log entry in a security log indicating whether the content item could be modified, a timestamp identifying when the security event occurred, and may include information indicating why the content item cannot be modified should the trusted entity 190 determine that the content item cannot be modified. The content integrity module 462 can be configured to prevent the content item from being modified responsive to the response from the trusted entity not being received within a predetermined time period from the request being sent and/or responsive to the request to the trusted entity being unable to be sent. For example, network congestion or a lack of network connectivity could prevent the target device 175 from communicating with the trusted entity 190, and the content integrity module 462 can be configured to prevent protected content from being modified until the target device 175 is able to communicate with the trusted entity 190.

FIG. 14 is a flow diagram of a process for performing a resultant action according to the techniques discussed herein. The process illustrated in FIG. 14 can be implemented using the target device 175. The content integrity module 462 of the target device 175 can provide means for performing the various stages included in the process illustrated in FIG. 14 unless otherwise specified. The process illustrated in FIG. 14 can be used to implement stage 720 of the process illustrated in FIG. 7, and can be used to perform a resultant action in response to the process illustrated in FIG. 9 determining that a content item has been modified.

The execution of the requested action on the content item can be prevented (stage 1405). The content integrity module 462 can be configured to prevent the action that was requested in stage 705 of the process illustrated in FIG. 7 from being performed on the content item responsive to the content item having been modified. The content integrity module 462 can be configured to instruct the processor 410 of the target device 175 to prevent the execution of the requested action on the content item.

A notification can be generated that the requested action cannot be performed on the content item (stage 1410). The content integrity module 462 can be configured to prevent the requested action from being performed on the content item responsive to the indication included in the response received from the trusted entity indicating that the content item cannot be modified. The content integrity module 462 can be configured to generate a log entry in a security log indicating whether the requested action could be performed, a timestamp identifying when the security event occurred, and may include information indicating why the requested action cannot be performed on the content item.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for protecting contents of a computing device, the method comprising:
   receiving a request to perform an action associated with a content item included in an image comprising a plurality of content items;
   accessing security level information associated with the content item and stored in the image by a trusted provider of the image, the security level information indicative of how each content item may be modified, the security level information comprising an integrity check action and a resultant behavior associated with the content item, wherein each of the plurality of content items of the image is associated with security level information for the content item, and wherein the integrity check action is selected from a plurality of integrity check actions, and the resultant behavior is selected from a plurality of resultant behaviors;
   performing the integrity check action associated with the content item; and
   performing the resultant behavior associated with the content item responsive to the integrity check action indicating that the action requested cannot be performed.

2. The method of claim 1, wherein the plurality of resultant behaviors comprises a catastrophic error handling response, an input-output (I/O) error response, a report to trusted entity response, and a rollback error response.

3. The method of claim 1, wherein the plurality of integrity check actions comprises a no-integrity-check-required action, a rollback protection action, and a device-specific check action.

4. The method of claim 3, wherein responsive to the integrity check action associated with the content item being the rollback protection action, performing the integrity check action associated with the content item comprises determining whether an update to the content item would result in the content item being replaced with a previous version of the content item, and performing the resultant behavior associated with the content item responsive to the integrity check action indicating that the action requested cannot be performed comprises preventing the content item from being replaced with the previous version of the content item.

5. The method of claim 1, wherein the integrity check action requires that integrity of content item be verified, and wherein performing the integrity check action further comprises
   accessing a block list to identify blocks associated with the content item,
   performing a hash of the blocks associated with the content item, and
   comparing the hash of the blocks associated with the content item with a hash of the content item included in the image.

6. A method for protecting contents of a computing device, the method comprising:
   receiving a request to modify a content item included in an image;
   accessing security level information associated with the content item, the security level information comprising an integrity check action and a resultant behavior associated with the content item;
   performing the integrity check action associated with the content item by reporting the request to a trusted entity; and
   performing the resultant behavior associated with the content item by
   receiving a response from the trusted entity indicating whether the content item can be modified;
   modifying the content item responsive to the response indicating that the content item can be modified; and
   displaying an indication that the content item cannot be modified responsive to the response indicating that the content item cannot be modified.

7. An apparatus comprising:
   means for receiving a request to perform an action associated with a content item included in an image comprising a plurality of content items;
   means for accessing security level information associated with the content item and stored in the image by a trusted provider of the image, the security level information indicative of how each content item may be modified, the security level information comprising an integrity check action and a resultant behavior associated with the content item, wherein each of the plurality of content items of the image is associated with security level information for the content item, and wherein the integrity check action is selected from a plurality of integrity check actions and the resultant behavior is selected from a plurality of resultant behaviors;
   means for performing the integrity check action associated with the content item; and
   means for performing the resultant behavior associated with the content item responsive to the integrity check action indicating that the action requested cannot be performed.

8. The apparatus of claim 7, wherein the plurality of resultant behaviors comprises a catastrophic error handling response, an input-output (I/O) error response, a report to trusted entity response, and a rollback error response.

9. The apparatus of claim 7, wherein the plurality of integrity check actions comprises a no-integrity-check-required action, a rollback protection action, and a device-specific check action.

10. The apparatus of claim 9, wherein the integrity check action associated with the content item being the rollback protection action, wherein the means for performing the integrity check action associated with the content item comprises means for determining whether an update to the content item would result in the content item being replaced with a previous version of the content item; and wherein the means for performing the resultant behavior associated with the content item responsive to the integrity check action indicating that the action requested cannot be performed comprises means for preventing the content item from being replaced with the previous version of the content item.

11. The apparatus of claim 7, wherein the integrity check action requires that integrity of content item be verified, the means for performing the integrity check action further comprises:
    means for accessing a block list to identify blocks associated with the content item,
    means for performing a hash of the blocks associated with the content item, and
    means for comparing the hash of the blocks associated with the content item with a hash of the content item included in the image, and
means for comparing the hash of the blocks associated with the content item with a hash of the content item included in the image.

12. An apparatus comprising:
    means for receiving a request to perform an action associated with a content item included in an image;
    means for accessing security level information associated with the content item, the security level information comprising an integrity check action and a resultant behavior associated with the content item;
    means for performing the integrity check action associated with the content item comprises means for reporting the request to a trusted entity; and
    means for performing the resultant behavior associated with the content item responsive further comprises
        means for receiving a response from the trusted entity indicating whether the content item can be modified;
        means for modifying the content item responsive to the response indicating that the content item can be modified; and
        means for displaying an indication that the content item cannot be modified responsive to the response indicating that the content item cannot be modified.

13. An apparatus comprising:
    a processor configured to
        receive a request to perform an action associated with a content item included in an image comprising a plurality of content items;
        access security level information associated with the content item and stored in the image by a trusted provider of the image, the security level information indicative of how each content item may be modified, the security level information comprising an integrity check action and a resultant behavior associated with the content item, wherein each of the plurality of content items of the image is associated with security level information for the content item, and wherein the integrity check action is selected from a plurality of integrity check actions and the resultant behavior is selected from a plurality of resultant behaviors;
        perform the integrity check action associated with the content item; and
        perform the resultant behavior associated with the content item responsive to the integrity check action indicating that the action requested cannot be performed.

14. The apparatus of claim 13, wherein the plurality of resultant behaviors comprises a catastrophic error handling response, an input-output (I/O) error response, a report to trusted entity response, and a rollback error response.

15. The apparatus of claim 13, wherein the plurality of integrity check actions comprises a no-integrity-check-required action, a rollback protection action, and a device-specific check action.

16. The apparatus of claim 15, wherein the integrity check action associated with the content item comprises the rollback protection action, and wherein the processor being configured to perform the integrity check action associated with the content item is further configured to determine whether an update to the content item would result in the content item being replaced with a previous version of the content item; and wherein the processor being configured to perform the resultant behavior associated with the content item responsive to the integrity check action indicating that the action requested cannot be performed is further configured to prevent the content item from being replaced with the previous version of the content item.

17. The apparatus of claim 13, wherein the integrity check action requires that integrity of the content item be verified, and wherein the processor is further configured to:
    access a block list to identify blocks associated with the content item,
    perform a hash of the blocks associated with the content item, and
    compare the hash of the blocks associated with the content item with a hash of the content item included in the image.

18. An apparatus comprising:
    a processor configured to
        receive a request to perform an action associated with a content item included in an image;
        access security level information associated with the content item, the security level information comprising an integrity check action and a resultant behavior associated with the content item;
        perform the integrity check action associated with the content item reporting the request to a trusted entity; and
        perform the resultant behavior associated with the content item, wherein the processor is further configured to
            receive a response from the trusted entity indicating whether the content item can be modified;
            modify the content item responsive to the response indicating that the content item can be modified; and
            display an indication that the content item cannot be modified responsive to the response indicating that the content item cannot be modified.

19. A non-transitory, computer-readable medium, having stored thereon computer-readable instructions for protecting contents of a computing device, comprising instructions configured to cause the computing device to:

receive a request to perform an action associated with a content item included in an image comprising a plurality of content items;
access security level information associated with the content item and stored in the image by a trusted provider of the image, the security level information indicative of how each content item may be modified, the security level information comprising an integrity check action and a resultant behavior associated with the content item, wherein each of the plurality of content items of the image is associated with security level information for the content item, and wherein the integrity check action is selected from a plurality of integrity check actions and the resultant behavior is selected from a plurality of resultant behaviors;
perform the integrity check action associated with the content item; and
perform the resultant behavior associated with the content item responsive to the integrity check action indicating that the action requested cannot be performed.

20. The non-transitory, computer-readable medium of claim 19, wherein the plurality of resultant behaviors comprises a catastrophic error handling response, an input-output (I/O) error response, a report to trusted entity response, and a rollback error response.

21. The non-transitory, computer-readable medium of claim 19, wherein the plurality of integrity check actions comprises a no-integrity-check-required action, a rollback protection action, and a device-specific check action.

22. The non-transitory, computer-readable medium of claim 21, wherein the integrity check action associated with the content item comprises the rollback protection action, and wherein the instructions configured to cause the computing device to perform the integrity check action associated with the content item further comprise instructions configured to cause the computing device to determine whether an update to the content item would result in the content item being replaced with a previous version of the content item; and wherein the instructions configured to cause the computing device to perform the resultant behavior associated with the content item responsive to the integrity check action indicating that the action requested cannot be performed further comprise instructions configured to cause the computing device to prevent the content item from being replaced with the previous version of the content item.

23. A non-transitory, computer-readable medium, having stored thereon computer-readable instructions for protecting contents of a computing device, comprising instructions configured to cause the computing device to:
receive a request to perform an action associated with a content item included in an image;
access security level information associated with the content item, the security level information comprising an integrity check action and a resultant behavior associated with the content item;
perform the integrity check action associated with the content item by reporting the request to a trusted entity; and
perform the resultant behavior associated with the content item responsive to the integrity check action, wherein the instructions configured to perform the resultant behavior further comprise instructions configured to cause the computing device to:
receive a response from the trusted entity indicating whether the content item can be modified;
modify the content item responsive to the response indicating that the content item can be modified; and
display an indication that the content item cannot be modified responsive to the response indicating that the content item cannot be modified.

24. The non-transitory, computer-readable medium of claim 19, wherein the integrity check action requiring that integrity of content item be verified, the instructions configured to cause the computing device to perform the integrity check further comprising instructions to cause the computing device to:
access a block list to identify blocks associated with the content item,
perform a hash of the blocks associated with the content item, and
compare the hash of the blocks associated with the content item with a hash of the content item included in the image.

* * * * *